United States Patent
Khan et al.

(10) Patent No.: US 12,516,441 B2
(45) Date of Patent: Jan. 6, 2026

(54) METHODS OF FABRICATING SYNTHETIC DIAMOND MATERIALS USING MICROWAVE PLASMA ACTIVATED CHEMICAL VAPOUR DEPOSITION TECHNIQUES AND PRODUCTS OBTAINED USING SAID METHODS

(71) Applicant: ELEMENT SIX TECHNOLOGIES LIMITED, Didcot (GB)

(72) Inventors: Rizwan Khan, Maidenhead (GB); Steven Coe, Didcot (GB); Jonathan Wilman, Didcot (GB); Daniel Twitchen, Didcot (GB); Geoffrey Scarsbrook, Didcot (GB); John Brandon, Didcot (GB); Christopher Wort, Didcot (GB); Matthew Markham, Didcot (GB); Ian Friel, Didcot (GB); Katharine Robertson, Didcot (GB)

(73) Assignee: ELEMENT SIX TECHNOLOGIES LIMITED, Didcot (GB)

( * ) Notice: Subject to any disclaimer, the term of this patent is extended or adjusted under 35 U.S.C. 154(b) by 661 days.

(21) Appl. No.: 17/408,166

(22) Filed: Aug. 20, 2021

(65) Prior Publication Data
US 2021/0395916 A1 Dec. 23, 2021

Related U.S. Application Data

(62) Division of application No. 15/036,692, filed as application No. PCT/EP2014/074864 on Nov. 18, 2014, now abandoned.

(30) Foreign Application Priority Data
Nov. 18, 2013 (GB) .................................. 1320304

(51) Int. Cl.
*C30B 25/10* (2006.01)
*C01B 32/25* (2017.01)
(Continued)

(52) U.S. Cl.
CPC ............ *C30B 25/105* (2013.01); *C01B 32/25* (2017.08); *C23C 16/274* (2013.01);
(Continued)

(58) Field of Classification Search
CPC ....... C30B 25/105; C30B 29/04; C01B 32/25; C23C 16/274; C23C 16/511; C23C 16/52
See application file for complete search history.

(56) References Cited

U.S. PATENT DOCUMENTS

| | | | |
|---|---|---|---|
| 5,443,032 | A | 8/1995 | Vichr et al. |
| 5,908,503 | A | 6/1999 | Sumiya et al. |

(Continued)

FOREIGN PATENT DOCUMENTS

| | | |
|---|---|---|
| GB | 2486779 | 6/2012 |
| GB | 2486783 | 6/2012 |

(Continued)

OTHER PUBLICATIONS

Achard, et al., The control of growth parameters in the synthesis of high-quality single crystalline diamond by CVD, Journal of Crystal Growth 2005; 284: 396-405 (Year: 2005).*

(Continued)

*Primary Examiner* — Daniel C. McCracken
(74) *Attorney, Agent, or Firm* — Kilpatrick Townsend & Stockton LLP

(57) ABSTRACT

A method of fabricating synthetic diamond material using a microwave plasma activated chemical vapour deposition technique is provided which utilizes high and uniform microwave power densities applied over large areas and for extended periods of time. Products fabricated using such a (Continued)

synthesis technique are described including a single crystal CVD diamond layer which has a large area and a low nitrogen concentration, and a high purity, fast growth rate single crystal CVD diamond material.

7 Claims, 3 Drawing Sheets

(51) Int. Cl.
    *C23C 16/27*     (2006.01)
    *C23C 16/511*     (2006.01)
    *C23C 16/52*     (2006.01)
    *C30B 29/04*     (2006.01)

(52) U.S. Cl.
    CPC ............ *C23C 16/511* (2013.01); *C23C 16/52* (2013.01); *C30B 29/04* (2013.01)

(56) References Cited

U.S. PATENT DOCUMENTS

| | | | |
|---|---|---|---|
| 2004/0221795 | A1 | 11/2004 | Scarsbrook et al. |
| 2007/0017437 | A1 | 1/2007 | Genis et al. |
| 2008/0044339 | A1* | 2/2008 | Scarsbrook ............ C30B 25/20 423/446 |
| 2009/0239078 | A1 | 9/2009 | Asmussen et al. |
| 2009/0258229 | A1 | 10/2009 | Summerton et al. |
| 2010/0015438 | A1 | 1/2010 | Williams et al. |
| 2017/0009376 | A1 | 1/2017 | Khan et al. |

FOREIGN PATENT DOCUMENTS

| | | |
|---|---|---|
| GB | 2486784 | 6/2012 |
| GB | 2497660 | 6/2013 |
| GB | 2497665 | 6/2013 |
| GB | 2500485 | 9/2013 |
| GB | 2506969 | 4/2014 |
| JP | 04280896 | 10/1992 |
| JP | 2005162525 | 6/2005 |
| JP | 2012111653 | 6/2012 |
| WO | 2001096633 | 12/2001 |
| WO | 2001096634 | 12/2001 |
| WO | 03052174 | 6/2003 |
| WO | 03052177 | 6/2003 |
| WO | 2004046427 | 6/2004 |
| WO | 2007066215 | 6/2007 |
| WO | 2010010344 | 1/2010 |
| WO | 2010010352 | 1/2010 |
| WO | 2011146460 | 11/2011 |
| WO | 2012084655 | 6/2012 |
| WO | 2012084656 | 6/2012 |
| WO | 2012084657 | 6/2012 |
| WO | 2012084658 | 6/2012 |
| WO | 2012084659 | 6/2012 |
| WO | 2012084661 | 6/2012 |
| WO | 2012084750 | 6/2012 |

OTHER PUBLICATIONS

Archard, et al., High quality MPACVD diamond single crystal growth: high microwave power density regime, J. Phys. D: Appl. Phys. 2007; 40: 6175-6188 (Year: 2007).*

Balmer et al., "Chemical vapour deposition synthetic diamond: materials, technology and applications," J. Phys.: Condens. Matter, 2009, pp. 1-23, vol. 21, No. 364221, IOP Publishing Ltd, United Kingdom.

Grotjohn et al., Scaling behavior of microwave reactors and discharge size for diamond deposition, Diamond & Related Materials 14, 2005, pp. 288-291, Elsevier.

King et al., "Scaling the microwave plasma-assisted chemical vapor diamond deposition process to 150-200 mm substrates," Diamond & Related Materials 17, 2008, pp. 520-524, Elsevier.

Liang et al., "Enhanced growth of high quality single crystal diamond by microwave plasma assisted chemical vapor deposition at high gas pressure," Applied Physics Letters 94, 2009, vol. 024103, American Institute of Physics.

Meng et al., High optical quality multicarat single crystal diamond produced by chemical vapor deposition, Phys. Status Solidi A 209, 2012, pp. 101-104, No. 1, Wiley-VCH Verlag Gmbh & Co. KGaA, Weinheim, Germany.

Turri et al., "Optical Absorption, Depolarization, and Scatter of Epitaxial Single-Crystal Chemical-Vapor-Deposited Diamond at 1.064 μm", Optical Engineering, Jun. 1, 2007, pp. 064002-1-064002-10, vol. 46, No. 6.

International Patent Application No. PCT/EP2014/074864, International Search Report and Written Opinion, Mailed on Feb. 19, 2015, 13 pages.

U.S. Appl. No. 15/036,692, "Restriction Requirement", filed Mar. 23, 2017, 10 pages.

U.S. Appl. No. 15/036,692, Non Final Office Action, Mailed on Apr. 6, 2017, 10 pages.

U.S. Appl. No. 15/036,692, Final Office Action, Mailed on Nov. 2, 2017, 9 pages.

U.S. Appl. No. 15/036,692, Non-Final Office Action, Mailed on Oct. 3, 2018, 11 pages.

U.S. Appl. No. 15/036,692, Final Office Action, Mailed on Apr. 4, 2019, 10 pages.

U.S. Appl. No. 15/036,692, Non-Final Office Action, Mailed on Dec. 11, 2019, 10 pages.

U.S. Appl. No. 15/036,692, Non-Final Office Action, Mailed on Jun. 25, 2020, 12 pages.

U.S. Appl. No. 15/036,692, Final Office Action, Mailed on Feb. 24, 2021, 11 pages.

\* cited by examiner

METHODS OF FABRICATING SYNTHETIC DIAMOND MATERIALS USING MICROWAVE PLASMA ACTIVATED CHEMICAL VAPOUR DEPOSITION TECHNIQUES AND PRODUCTS OBTAINED USING SAID METHODS

CROSS REFERENCE TO RELATED APPLICATIONS

This application is a divisional application of U.S. patent application Ser. No. 15/036,692 filed on May 13, 2016 which is a U.S. national phase of International Application No. PCT/EP2014/074864 filed on Nov. 18, 2014, and published in English on May 21, 2015 as International Publication No. WO 2015/071484 A1, which application claims priority to Great Britain Patent Application No. 1320304.7 filed on Nov. 18, 2013, the contents of which are incorporated herein by reference.

FIELD OF INVENTION

The present invention relates to methods of fabricating synthetic diamond materials using microwave plasma active chemical vapour deposition techniques and products obtained using said methods. Products comprising very high purity single crystal synthetic diamond material are described and method of manufacturing the same at increased growth rates while retaining exceptional electronic, optical, thermal, and/or quantum coherence characteristics. Such a high purity single crystal CVD diamond material is useful in a range of applications including optical components, electronic components, radiation detectors, and quantum sensing and information processing devices. Certain further implementations relate to more economic methods for fabricating lower purity synthetic diamond products. Yet further implementations relate to synthesis of large area synthetic diamond wafers with improved electronic, optical, thermal, and/or quantum coherence characteristics.

BACKGROUND OF INVENTION

By way of background, a short introduction to diamond materials science is presented here in order to set the context for the present invention.

Diamond materials are based on a theoretically perfect diamond lattice. The properties that would be exhibited by this theoretically perfect lattice are well understood. For example, such a theoretically perfect diamond lattice would exhibit extremely high thermal conductivity, low electrical conductivity (very wide band gap intrinsic semi-conductor with no significant charge carriers but with high charge carrier mobility if charge carriers are introduced into the lattice structure), extremely low thermal expansion coefficient, no significant optical birefringence, and low optical absorption (no significant absorption in the visible spectrum so there would be no colour).

Such a theoretically perfect diamond lattice is thermodynamically impossible to attain. In reality, it is practically difficult to even approach a level of perfection which would be possible to achieve in theory when taking into account thermodynamic considerations. As such, it should be apparent that all diamond materials contain a significant number of defects. Such defects may come in the form of impurities. Typical impurities which may be incorporated into a diamond lattice structure include nitrogen, boron, silicon, phosphorous, hydrogen, and metals such as sodium, nickel, cobalt, and chromium. Additionally, defects within diamond materials also include crystallographic deviations from the perfect diamond lattice structure in the form of point defects such as vacancies and interstitials and extended defects such as various forms of dislocation defects. Defects may also combine in various ways. For example, vacancy defects may combine into clusters or combine with impurity atoms to form unique vacancy structures with their own individual properties. Examples include silicon containing defects such as silicon-vacancy defects (Si—V), silicon di-vacancy defects (Si—$V_2$), silicon-vacancy-hydrogen defects (Si—V:H), silicon di-vacancy hydrogen defects (S—$V_2$:H) and nitrogen containing defects such as nitrogen-vacancy defects (N—V), di-nitrogen vacancy defects (N-V-N), and nitrogen-vacancy-hydrogen defects (N-V-H). These defects are typically found in a neutral charge state or in a charged state, e.g. negatively charged.

Defects within diamond materials significantly alter the properties of the materials. On-going work in this field is concerned with understanding the properties of the various defects within diamond materials and their overall effect on the functional properties of the materials. Furthermore, on-going work is concerned with engineering diamond materials to have particular types and distributions of defects in order to tailor diamond materials to have particular desirable properties for particular applications. The types and distributions of defects which are desired will thus depend on the properties required for particular applications.

In this regard, diamond materials may be categorized into three main types: natural diamond materials; HPHT (high pressure high temperature) synthetic diamond materials, and CVD (chemical vapour deposited) synthetic diamond materials. These categories reflect the way in which the diamond materials are formed. Furthermore, these categories reflect the structural and functional characteristics of the materials. This is because while natural, HPHT synthetic, and CVD synthetic diamond materials are all based on a theoretically perfect diamond lattice the defects in these material are not the same. For example, CVD synthetic diamond contains many defects unique to the process of CVD, and whilst some defects are found in other diamond forms, their relative concentration and contribution is very different. As such, CVD synthetic diamond materials are different to both natural and HPHT synthetic diamond materials.

Diamond materials may also be categorized according to their physical form. In this regard, diamond materials may be categorized into three main types: single crystal diamond materials; polycrystalline diamond materials; and composite diamond materials. Single crystal diamond materials are in the form of individual single crystals of various sizes ranging from small "grit" particles used in abrasive applications through to large single crystals suitable for use in a variety of technical applications as well for gemstones in jewellery applications. Polycrystalline diamond materials are in the form of a plurality of small diamond crystals bonded together by diamond-to-diamond bonding to form a polycrystalline body of diamond material such as a polycrystalline diamond wafer. Such polycrystalline diamond materials can be useful in various applications including thermal management substrates, optical windows, and mechanical applications. Composite diamond materials are generally in the form of a plurality of small diamond crystals bonded together by diamond-to-diamond or a non-diamond matrix to form a body of composite material. Various diamond composites are known including diamond containing metal matrix composites, particularly cobalt metal matrix composites known as PCD, and skeleton cemented diamond (ScD) which is a composite comprising silicon, silicon carbide, and diamond particles.

It should also be appreciated that within each of the aforementioned categories there is much scope for engineering diamond materials to have particular concentrations and distributions of defects in order to tailor diamond materials to have particular desirable properties for particular applications. In this regard, the present invention is concerned with CVD synthetic diamond materials to which the focus of this specification will now turn.

CVD processes for synthesis of diamond material are now well known in the art. Useful background information relating to the chemical vapour deposition of diamond materials may be found in a special issue of the Journal of Physics: Condensed Matter, Vol. 21, No. 36 (2009) which is dedicated to diamond related technology. For example, the review article by R. S Balmer et al. gives a comprehensive overview of CVD diamond materials, technology and applications (see "Chemical vapour deposition synthetic diamond: materials, technology and applications" J. Phys.: Condensed Matter, Vol. 21, No. 36 (2009) 364221).

Being in the region where diamond is metastable compared to graphite, synthesis of diamond under CVD conditions is driven by surface kinetics and not bulk thermodynamics. Diamond synthesis by CVD is normally performed using a small fraction of carbon (typically <5%), typically in the form of methane although other carbon containing gases may be utilized, in an excess of molecular hydrogen. If molecular hydrogen is heated to temperatures in excess of 2000 K, there is a significant dissociation to atomic hydrogen. In the presence of a suitable substrate material, CVD synthetic diamond material can be deposited. Polycrystalline CVD diamond material may be formed on a non-diamond substrate such as a refractory metal or silicon substrate. Single crystal CVD synthetic diamond material may be formed by homoepitaxial growth on a single crystal diamond substrate.

Atomic hydrogen present in the process selectively etches off non-diamond carbon from the substrate such that diamond growth can occur. Various methods are available for heating carbon containing gas species and molecular hydrogen in order to generate the reactive carbon containing radicals and atomic hydrogen required for CVD synthetic diamond growth including arc-jet, hot filament, DC arc, oxy-acetylene flame, and microwave plasma.

Impurities in the CVD process gases are incorporated into the CVD synthetic diamond material during growth. As such, various impurities may be intentionally introduced into the CVD process gases, or intentionally excluded from the CVD process gases, in order to engineer a CVD synthetic diamond material for a particular application. Furthermore, the nature of the substrate material and the growth conditions affect the type and distribution of defects incorporated into the CVD synthetic diamond material during growth.

For certain applications it is desirable to minimize the number of defects, or at least certain types of defect, within the diamond lattice structure. For example, for certain electronic applications such as radiation detectors or semi-conductive switching devices it is desirable to minimize the number of charge carriers inherent in the diamond material and increase the mobility of charge carriers intentionally introduced into the material in use. Such a material may be engineered by fabricating a single crystal CVD synthetic diamond material which has a low concentration of impurities which would otherwise introduce charge carriers into the diamond lattice structure. Patent literature relevant to such electronic/detector grade single crystal CVD synthetic diamond material includes WO01/096633 and WO01/096634.

For certain optical applications it is desirable to provide a material which has low optical absorbance and low optical birefringence. Such a material may be engineered by fabricating a single crystal CVD synthetic diamond material which has a low concentration of impurities, which would otherwise increase the optical absorbance of the material, and a low concentration of extended defects which would otherwise introduce anisotropic strain into the diamond lattice structure causing birefringence. Patent literature relevant to such optical grade single crystal CVD synthetic diamond material includes WO2004/046427 and WO2007/066215.

High purity diamond material is also desirable to function as a host material for quantum spin defects in certain quantum sensing and processing applications (e.g. in measuring magnetic fields). Diamond materials are useful in such applications as certain quantum spin defects (e.g. the negatively charge nitrogen-vacancy defect) disposed within the diamond lattice structure have a long decoherence time even at room temperature (i.e. the quantum spin defects remain in a specific quantum spin state for a significant length of time allowing sensing and/or quantum processing applications to be performed). Furthermore, such quantum spin defects within the diamond lattice can be optically addressed. However, in such applications impurities can interact with quantum spin defects within the diamond lattice structure reducing their decoherence time and thus reducing their sensitivity and/or reducing the time during which quantum processing applications can be performed. Patent literature relevant to such high purity quantum grade single crystal CVD synthetic diamond material includes WO 2010010344 and WO 2010010352.

In contrast to the low defect materials described above, for certain applications it is desirable to intentionally introduce a significant but controlled quantity, type, and distribution of defects into the diamond lattice structure. For example, introducing boron into the diamond lattice by providing a boron containing gas within the CVD process gases provides an acceptor level within the band structure of the diamond material thus forming a p-type semi-conductor. If extremely high levels of boron are introduced into the diamond lattice structure the material shows full metallic conductivity. Such materials are useful as electrodes, as electrochemical sensing electrodes, and in electronic applications. Patent literature relevant to such boron doped single crystal CVD synthetic diamond material includes WO03/052174.

Another example is that of nitrogen doped single crystal CVD synthetic diamond materials. Nitrogen is one of the most important dopants in CVD diamond material synthesis as it has been found that providing nitrogen in the CVD process gas increases the growth rate of the material and can also affect the formation of crystallographic defects such as dislocations. As such, nitrogen doping of single crystal CVD synthetic diamond materials has been extensively investigated and reported in the literature. Nitrogen doped CVD synthetic diamond material tends to be brown in colour. As such, for the previously discussed applications, such as optical applications, it has been found to be advantageous to develop techniques which intentionally exclude nitrogen from the CVD process gases. However, for applications such as mechanical applications where optical, electronic, and quantum coupling parameters are not a concern, nitrogen doping to significant levels can be useful in achieving growth of thick layers of CVD synthetic diamond material. Patent literature relevant to such nitrogen doped single crystal CVD synthetic diamond material includes WO2003/052177 which describes a method of fabricating diamond material using a CVD synthesis atmosphere comprising nitrogen in a concentration range 0.5 to 500 ppm, calculated as molecular nitrogen.

In light of the above, it will be evident that diamond materials come in a range of different forms and can be engineered to have a range of different properties for particular applications. Certain embodiments of the present invention are particularly concerned with the fabrication of low defect, high purity single crystal CVD synthetic diamond material. In this regard, background prior art of relevance includes the previously discussed electronic/detector grade single crystal CVD synthetic diamond material as described in WO01/096633 and WO01/096634, the optical grade single crystal CVD synthetic diamond material as described in WO2004/046427 and WO2007/066215, and the high purity quantum grade single crystal CVD synthetic diamond material as described in WO 2010010344 and WO 2010010352. Additional prior art includes U.S. Pat. No. 5,908,503, JP4280896, and WO2011/146460.

A problem with synthesizing low defect, high purity single crystal CVD synthetic diamond material is that such material has a very low growth rate and is thus time consuming and expensive to manufacture. Furthermore, due to the extended time periods required to obtain a desired thickness of such material at low growth rates, the growth process must be very precisely controlled over extended time periods and this can be difficult to achieve in practice resulting in reduced yields. Electronic/detector grade single crystal CVD synthetic diamond material as described in WO01/096633 and WO01/096634 is grown using a CVD growth process in which nitrogen is essentially excluded, at least to the extent that this is practically possible (e.g. no more than 300 ppb, 200 ppb, 100 ppb, 50 ppb, or 20 ppb of nitrogen in the CVD synthesis atmosphere). In contrast, optical grade single crystal CVD synthetic diamond material as described in WO2004/046427 is grown using a CVD growth process in which a low and controlled concentration of nitrogen is introduced to increase growth rates while not being so high as to unduly affect optical properties. However, while single crystal CVD synthetic diamond material according to this process is suitable for many optical applications, the concentration of nitrogen incorporated into the material is such that the material is not ideally suited for certain high-end optical applications and certain other applications such as electronic, radiation detector, and quantum sensing and processing applications which require higher purity material and a CVD growth process in which nitrogen is essentially excluded. Furthermore, even for applications which are not detrimentally affected by the presence of a low and controlled concentration of nitrogen in the single crystal CVD synthetic diamond material, it can be difficult to obtain consistent and reproducible optical properties, such as low absorption, utilizing a low and controlled nitrogen addition.

In relation to the above, a number of groups have investigated CVD diamond growth parameters including microwave power, gas pressure, and deposition area to synthesize single crystal CVD diamond material. One type of approach involves growth on a single substrate. In such an approach it is believed that plasma focussing increases power density over a small growth area and can increase vertical growth rates and crystal quality over a small growth area. However, such a plasma focussing route is not suitable for achieving high power densities across relatively large growth areas to enhance volume growth rate. That is, while vertical growth rate of single crystal CVD diamond material may be enhanced by plasma focussing on a small growth area, the volume of single crystal CVD diamond material which is synthesized per unit time is relatively small as growth occurs over only a small area due to plasma focussing, e.g. over only one single crystal diamond substrate. An alternative approach is to grow single crystal CVD diamond material over a plurality of single crystal diamond substrates. Such an approach can be used to increase the volume of single crystal CVD diamond material which is grown per unit time. However, as the growth area is increased the power density decreases thus decreasing the growth rate on each individual single crystal diamond substrate. A decrease in power density also leads to a decrease in the quality of single crystal CVD diamond material which is synthesized. Some examples of prior art synthesis processes are briefly summarized below.

Liang et al. (APPLIED PHYSICS LETTERS 94, 024103, 2009) describe enhanced growth of high quality single crystal diamond by microwave plasma assisted chemical vapour deposition at high gas pressures. An ASTEX 5400 CVD reactor apparatus was used for the synthesis operating at a microwave power in a range 3-5 kW and using a chemistry comprising a nitrogen to methane ratio ($N_2/CH_4$) in a range 0 to 2%. Three single crystal CVD diamond growth runs are described, each of which appears to be a single stone growth process. Power density is not quoted and there is no evidence of deposition over significant areas. Since the ASTEX 5400 CVD reactor apparatus is a 2.45 GHz system the deposition area is limited. A colourless single crystal CVD diamond product is obtained which exhibits relatively low flourescence under room temperature photoluminescent conditions. No spatially-dependent flourescence data is shown.

Meng et al. (Phys. Status Solidi A 209, No. 1, 101-104, 2012) describe high optical quality multi-carat single crystal diamond produced by chemical vapour deposition. Single stone CVD diamond growth was performed in multiple runs on a substrate of size 9 mm×9 mm using a total power of 3-5 kW. Colourless material with low nitrogen-vacancy flourescence was produced.

Grotjohn et al. (Diamond & Related Materials 14 (2005) 288-291) describe scaling behaviour of microwave reactors and discharge size for diamond deposition. Assuming all microwave power is absorbed in the substrate/carrier (in practice it will be some fraction of this), a power density of up to 0.9 W/mm$^2$ may be derived for a 50 mm carrier, a power density of up to 0.5 W/mm$^2$ may be derived for a 75 mm carrier, and a power density of up to 0.4 W/mm$^2$ may be derived for a 150 mm carrier. No diamond synthesis data is presented.

King et al. (Diamond & Related Materials 17 (2008) 520-524) also describe the scaling behaviour of a microwave plasma-assisted chemical vapour diamond deposition process for 150-200 mm substrates. Assuming all microwave power is absorbed in the substrate/carrier (in practise it will be some fraction of this), a power density of up to 0.5 W/mm$^2$ may be derived for a 150 mm carrier and a power density of up to 0.2 W/mm$^2$ may be derived for a 200 mm carrier. Only polycrystalline CVD diamond material was grown. There is no disclosure of how power density affects single crystal CVD diamond growth.

US2009/0239078 describes a multi-substrate single crystal CVD diamond growth process in which nitrogen gas is added to the synthesis atmosphere to assist diamond growth. Assuming all microwave power is absorbed in the substrate/ carrier, Example II gives a power density up to 1.4 W/mm² for a 150 mm carrier comprising 70 seed substrates using a power of 11 kW over a 4 to 5 inch deposition area.

One problem with prior art methodologies is how to achieve very high purity single crystal CVD synthetic diamond material, suitable for certain high-end optical applications and certain other applications such as electronic, radiation detector, and quantum sensing and processing applications, at increased volume growth rates (e.g. over a plurality of single crystal diamond growth substrates) while avoiding the addition of nitrogen to enhance growth rates.

In addition, even for applications which are not detrimentally affected by the presence of a low and controlled concentration of nitrogen in the single crystal CVD synthetic diamond material, it would be desirable to develop a growth process which is capable of fabricating a single crystal CVD diamond material which has more consistent and reproducible optical properties while maintaining a comparable growth rate to that achieved by a low and controlled nitrogen addition.

Further still, it would be desirable to develop a growth process which is less sensitive to the presence of impurities in the CVD synthesis atmosphere, particularly nitrogen, whereby impurity uptake in the single crystal CVD diamond material is reduced over a plurality of single crystal diamond growth substrates. Such a growth process would allow the synthesis of high purity single crystal CVD diamond material over a large number of single crystal diamond substrates without the current requirement for very high purity synthesis gases and a reactor chamber design which is configured to alleviate problems of leakage, atmospheric gas infiltration, and/or adsorption and desorption of impurity species at internal surfaces of the reactor chamber. That is, such a process would be capable of achieving synthesis of the same quality and/or purity of single crystal CVD diamond material as current processes at lower cost by reducing the requirements for excluding impurities in the synthesis atmosphere. Further still, such a process would be capable of achieving synthesis of higher quality and/or higher purity single crystal CVD diamond material as current processes which utilize very high purity synthesis gases and a reactor chamber design which is configured to alleviate problems of leakage, atmospheric gas infiltration, and/or adsorption and desorption of impurity species at internal surfaces of the reactor chamber.

Yet further, it has also been noted that while very high purity single crystal CVD synthetic diamond material, such as that described in WO01/096633 and WO01/096634, exhibits substantially no fluorescence due to nitrogen-vacancy defects, the material does exhibit some fluorescence as a result of dislocation defects. For certain applications it would be desirable to fabricate a material which comprises substantially no fluorescence either from nitrogen-vacancy defects or from dislocation defects.

In addition to all of the above, there is an on-going need to provide a fabrication route to achieve large area wafers of synthetic diamond material with suitable mechanical, optical, thermal, electronic, and/or quantum properties for end applications. At the time of writing this specification high quality single crystal synthetic diamond material is only available in relatively small sizes. Polycrystalline CVD diamond wafers are available in larger areas and are suitable for many applications. However, due to the polycrystalline nature of such wafers their functional properties are generally not as good as high quality single crystal diamond materials. One approach known in the art for increasing the area of single crystal synthetic diamond products is to provide a tiled array of single crystal diamond substrates and grow a single layer of single crystal diamond material over the tiled array of substrates using a chemical vapour deposition technique. However, it is difficult to achieve good quality single crystal diamond growth over interface regions between the tiled substrates and to date it has been required to introduce significant portions of nitrogen into the synthesis atmosphere to achieve reasonable intergrowth of single crystal diamond material grown over tiled substrates. This results in a significant quantity of nitrogen being incorporated into the single crystal CVD diamond wafer grown over the tiled array of substrates detrimentally affecting the mechanical, optical, thermal, electronic, and/or quantum properties for end applications.

It is an aim of certain embodiments of the present invention to solve one or more of the aforementioned problems.

SUMMARY OF INVENTION

The present applicant has previously filed a number of patent applications directed to microwave plasma activated CVD reactor hardware and CVD diamond synthesis methodology for achieving high quality, thick CVD diamond growth of both single crystal and polycrystalline CVD diamond materials over relatively large areas and relatively high growth rates. These patent applications include patent applications describing certain aspects of the structure and geometry of the microwave plasma chamber (e.g. WO2012/084661 which describes the use of a compact $TM_{011}$ resonance mode plasma chamber configuration and WO2012/084657 which describes the provision of a plasma stabilizing annulus projecting from a side wall of the plasma chamber), certain aspects of the microwave power coupling configuration (e.g. WO2012/084658 which describes a microwave power delivery system for supplying microwave power to a plurality of microwave plasma reactors and WO2012/084659 which describes a microwave coupling configuration comprising an annular dielectric window, a coaxial waveguide, and a waveguide plate comprising a plurality of apertures disposed in an annular configuration for coupling microwaves towards the plasma chamber), certain aspects of the substrate preparation, geometry, and temperature control configurations within the microwave plasma chamber (e.g. WO2012/084655 which describes how to prepare, locate, and control substrate parameters within a microwave plasma reactor to achieve desirable electric field and temperature profiles), and certain aspects of the gas flow configuration and gas flow parameters within a microwave plasma chamber (e.g. WO2012/084661 which describes a microwave plasma reactor with a multi-nozzle gas inlet array having a desirable geometric configuration for achieving uniform diamond growth over large areas and WO2012/084656 which describes the use of high gas flow rates and injection of process gases with a desirable Reynolds number to achieving uniform doping of synthetic diamond material over large areas).

Several of the aforementioned documents also describe that the microwave plasma activated CVD reactor hardware and CVD diamond synthesis methodology is capable of generating high microwave power densities over the growth surface of the substrate. For example, WO2012/084655 discloses a power density operating range of 0.05 to 10 W/mm² while WO2012/084657, WO2012/08661 and WO2012/084656 disclose power densities up to and above 3.5 W/mm².

Following on from the work described in the aforementioned documents, the present applicant has found that using suitable microwave plasma activated CVD reactor hardware and CVD diamond synthesis methodology it is possible to achieve high and uniform power densities over large substrate areas and maintain such power densities over long operating times to achieve the fabrication of large volumes of synthetic diamond material at high volume growth rates and with reduced impurities.

A method of fabricating synthetic diamond material using a microwave plasma activated chemical vapour deposition technique is described herein, the method comprising:

introducing a substrate into a plasma chamber;

introducing process gases into the plasma chamber, the process gases including hydrogen gas and a carbon source gas; and introducing microwaves into the plasma chamber to activate the process gases and form a plasma proximate to a growth surface of the substrate wherein synthetic diamond material is grown over the growth surface of the substrate, wherein during growth of the synthetic diamond material a microwave power density is maintained at a power density of at least 3 $W/mm^2$ over a growth surface area of at least 1963 $mm^2$ (corresponding to a 50 mm diameter substrate) for a time period of at least 24 hours said microwave power density being calculated by dividing input microwave power by substrate growth surface area.

Further to the above synthesis method, a single crystal CVD synthetic diamond material product is described herein, the single crystal CVD synthetic diamond material comprising: substantially no orange luminescence from nitrogen-vacancy defects as viewed under photoluminescent conditions; and substantially no blue luminescence from dislocation defects as viewed under photoluminescent conditions.

In addition to the above, another product in the form of a single crystal CVD diamond layer is described herein, the single crystal CVD diamond layer comprising: a total nitrogen concentration as measures by secondary ion mass spectrometry of no more than 2 ppm; and an area of at least 324 $mm^2$.

BRIEF DESCRIPTION OF THE DRAWINGS

For a better understanding of the present invention and to show how the same may be carried into effect, embodiments of the present invention will now be described by way of example only with reference to the accompanying drawings, in which.

DETAILED DESCRIPTION

Figure 1:
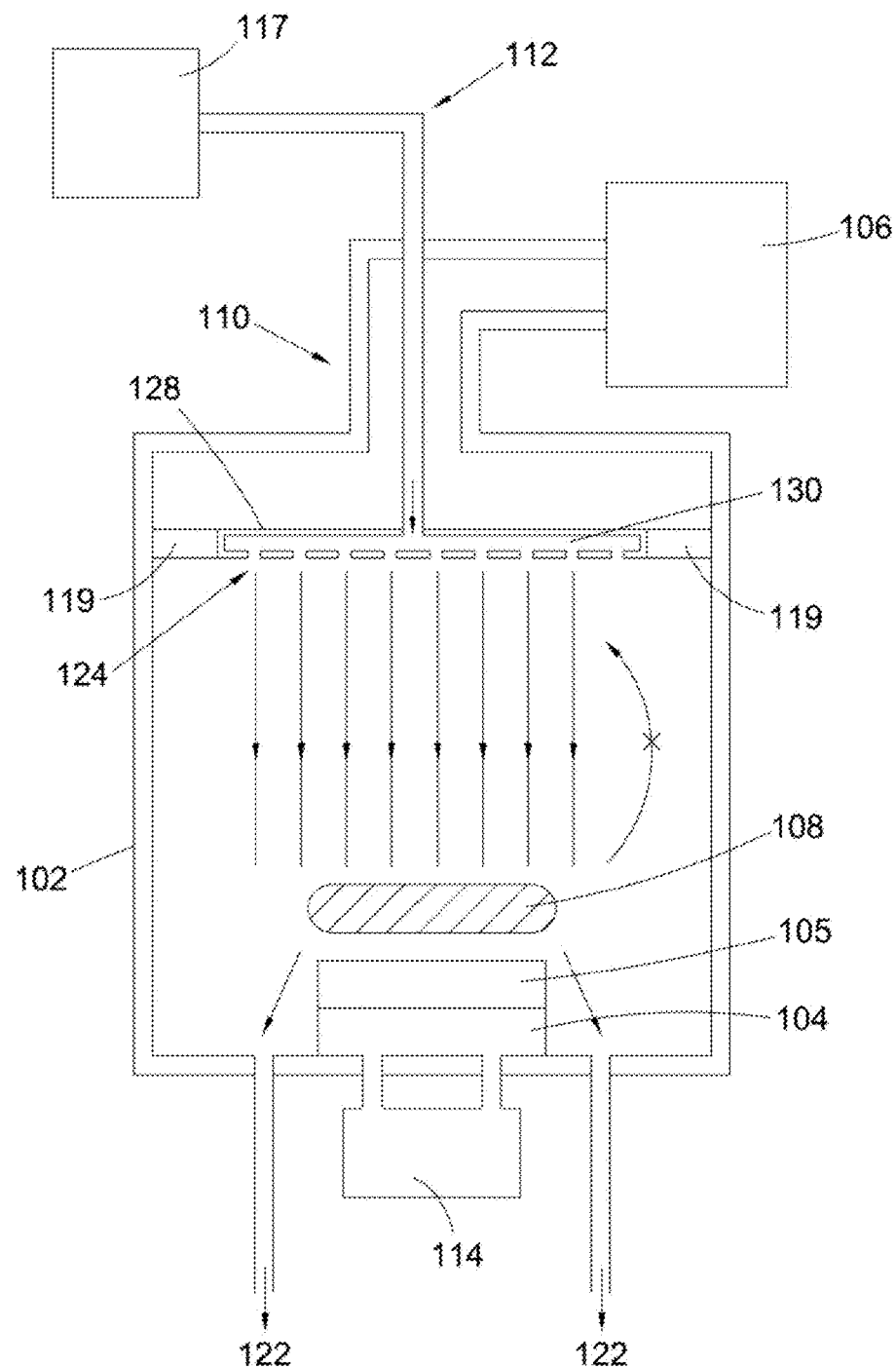
FIG. 1 shows a schematic diagram of a CVD reactor for fabricating single crystal CVD diamond material.

As previously described in the summary of invention section, a method of fabricating synthetic diamond material using a microwave plasma activated chemical vapour deposition technique is provided which utilizes high and uniform microwave power densities applied over large areas and for extended periods of time.

The microwave power density may be maintained at a power density of at least 3.2 $W/mm^2$, 3.4 $W/mm^2$, or 3.6 $W/mm^2$ and/or no more than 10 $W/mm^2$, 8 $W/mm^2$, 6 $W/mm^2$, 5 $W/mm^2$, or 4 $W/mm^2$. The optimal power density within these ranges will be dependent on the precise product which is being fabricated.

Furthermore, the microwave power density is maintained at a target value with a variation over time of no more than ±5%, ±3%, ±2%, or ±1% as measured by fluctuations in total microwave power input to the plasma chamber averaged over 5 second measurement periods for a time period forming at least 30%, 50%, 70%, 90%, or 95% of a total growth time period. For example, the microwave power input to the plasma chamber may be continuously measured during a growth run. The measurement data may then be split into a plurality of 5 second measurement periods and the microwave power averaged over each 5 second measurement period to yield an average microwave power for each 5 second time period during the growth run. The variations in these average values over the growth run should then meet the aforementioned requirement that the variation is no more than ±5%, ±3%, ±2%, or ±1% of an average microwave power. This will equate, at least approximately, to the percentage variation in microwave power density over the growth surface area. Furthermore, by averaging measurements over 5 second time periods this will allow for very short time scale fluctuations in power which may not affect diamond growth. The power density may thus be maintained at a target value with a variation of no more than ±0.5 $W/mm^2$, ±0.3 $W/mm^2$, ±0.2 $W/mm^2$, ±0.1 $W/mm^2$, ±0.05 $W/mm^2$, or ±0.03 $W/mm^2$ as measured in this way. Maintaining a high and uniform microwave power density over extended time periods allows the fabrication of uniform diamond products and alleviates problems of non-uniformities leading to thermal stress and cracking of the diamond products.

The growth surface area over which the high and uniform power density is maintained during diamond growth may be at least 1963 $mm^2$, 2827 $mm^2$, 3848 $mm^2$, 5027 $mm^2$, 6362 $mm^2$, or 7054 $mm^2$ and/or no more than 15394 $mm^2$, 13273 $mm^2$, 11310 $mm^2$, or 9503 $mm^2$ (corresponding to substrate diameters of at least 60 mm, 70 mm, 80 mm, 90 mm, or 100 mm and/or no more than 140 mm, 130 mm, 120 mm, or 110 mm). Furthermore, it has been found that high and uniform power density over such growth surface areas may be maintained for extended time periods of at least 48 hours, 72 hours, 96 hours, 120 hours, 168 hours, 216 hours, 288 hours, 360 hours, 432 hours, or 504 hours. The optimal growth surface area and growth time within these ranges will be dependent on the precise product which is being fabricated.

It should be noted that the maintenance of extreme power densities over large areas for extended periods of time during diamond growth is not a trivial matter or simple design choice and that precise control of operating conditions is required to maintain a stable plasma and achieve this methodology.

The methodology as defined above may be used to achieve a number of different desirable diamond products as described below.

Single crystal and polycrystalline CVD diamond products having the same specifications as currently available products can be synthesized in a more economically viable manner. High power densities over large growth areas which are maintainable for extended time periods allow the growth of large volumes of diamond material at accelerated growth rates thus reducing costs. Furthermore, high power densities have been found to reduce the rate of uptake of impurities from the process gases into the growing diamond material thus negating the requirement to utilize very high purity processes gases which are expensive.

Improved single crystal and polycrystalline CVD diamond products having higher specifications than currently available products can be fabricated. For example, by using high purity process gases in combination with high power densities over large growth areas which are maintainable for extended time periods a reduced impurity uptake leads to higher purity diamond products. Furthermore, the high growth rates achieved by using high power densities over large growth areas which are maintainable for extended time periods can subtly change the crystal structure of the diamond material such as by changing the dislocation distribution and reducing the concentration of blue fluorescent dislocations under photoluminescent conditions. For example, one product is a single crystal CVD synthetic diamond material comprising: substantially no orange luminescence from nitrogen-vacancy defects as viewed under photoluminescent conditions; and substantially no blue luminescence from dislocation defects as viewed under photoluminescent conditions.

Large area diamond wafers having specifications equivalent, or at least approaching, those which are only currently available in small area single crystal form may be fabricated. For example, as described in the background section, one approach to increasing the area of single crystal synthetic diamond products is to provide a tiled array of single crystal diamond substrates and grow a single layer of single crystal diamond material over the tiled array of substrates. However, it is difficult to achieve good quality single crystal diamond growth over interface regions between the tiled substrates and to date it has been required to introduce significant portions of nitrogen into the synthesis atmosphere to achieve reasonable intergrowth of single crystal diamond material grown over tiled substrates. This results in a significant quantity of nitrogen being incorporated into the single crystal CVD diamond wafer grown over the tiled array of substrates detrimentally affecting the mechanical, optical, thermal, and/or electronic properties for end applications. In contrast, embodiments of the present invention propose to apply high power densities over large growth areas which are maintainable for extended time periods in order to encourage single crystal diamond growth over interface regions of a tiled array of substrates to achieve large area single crystal CVD diamond wafers with a relatively low nitrogen content and improved mechanical, optical, thermal, and/or electronic properties. This approach is intended to combine the material properties of small single crystal CVD diamond products with the area size of polycrystalline CVD diamond wafers. For example, one product is in the form of a single crystal CVD diamond layer comprising: a total nitrogen concentration as measures by secondary ion mass spectrometry of no more than 2 ppm; and an area of at least 324 mm$^2$.

The methodolology can be used to a very high purity synthetic diamond material suitable for high-end optical applications and other applications such as electronic, radiation detector, and quantum sensing and processing applications, at increased growth rates while avoiding the addition of nitrogen to enhance growth rates. In such applications, the concentration of nitrogen intentionally added to the process gases in the plasma chamber as a dopant may be less than 1 ppm, 0.8 ppm, 0.6 ppm, 0.5 ppm, 0.4 ppm, 0.3 ppm, 0.2 ppm, 0.1 ppm or zero calculated as molecular nitrogen. Furthermore, high purity gases may be utilized such that the concentration of nitrogen present in the process gases in the plasma chamber, either present as an intentionally added dopant or as an impurity in the other process gases, is less than 1 ppm, 0.8 ppm, 0.6 ppm, 0.5 ppm, 0.4 ppm, 0.3 ppm, 0.2 ppm or 0.1 ppm calculated as molecular nitrogen. This contrasts with the teachings of the applicant's earlier patent application (WO2012/084656) which discloses the use of high gas flow rates and high power densities to produced doped diamond materials with uniform dopant. The present applicant has found that high power densities are also advantageous to produced high purity, undoped diamond materials.

The methodology can be used to fabricate existing products in a more economic manner by achieving increased volume growth rates and less sensitivity to impurities allowing the use of less pure process gases. In such applications the concentration of nitrogen intentionally added to the process gases in the plasma chamber as a dopant may be less than 1 ppm, 0.8 ppm, 0.6 ppm, 0.5 ppm, 0.4 ppm, 0.3 ppm, 0.2 ppm, 0.1 ppm or zero calculated as molecular nitrogen as described above but the concentration of nitrogen present as impurity in the process gases may be equal to or higher than 0.1 ppm, 0.2 ppm, 0.3 ppm, 0.4 ppm, 0.5 ppm, 0.6 ppm, 0.8 ppm, or 1 ppm. The lower sensitivity to impurities in the process gases can also provide a growth process which is capable of fabricating a synthetic diamond material which has more consistent and reproducible optical properties while maintaining a comparable growth rate to that achieved by a low and controlled nitrogen addition.

Advantageously, the methodology can be combined with high gas flow rates as described in WO2012/084656. High velocity, highly uniform gas flow, increases the efficiency at which input power is transmitted to the substrate. Accordingly, the process gases may be injected towards the growth surface at a total gas flow rate of at least 1, 3, 5, or 7 standard litres per minute and/or a total gas flow rate of no more than 30, 20, 15, or 12 standard litres per minute. Furthermore, the process gases are injected into the plasma chamber through one or more gas inlet nozzles with a Reynolds number in a range 1 to 100. While WO2012/084656 discloses the use of such synthesis conditions to produced doped diamond materials with uniform dopant, it has been found that such synthesis conditions are also advantageous to produced high purity, undoped diamond materials.

As a very high power density is applied to the substrate for prolonged periods of time using the methodology as described herein it is desirable to select a substrate which is capable of handling such extreme power densities. For example, the substrate may comprise a refractory metal disk, e.g. tungsten. Polycrystalline CVD diamond material can be fabricated directly on such a refractory metal disk.

To fabricate single crystal diamond material, the substrate may comprises a carrier substrate, such as the previously mentioned refractory metal disk, on which a plurality of single crystal CVD diamond substrates are mounted, wherein the microwave power density is calculated by dividing input microwave power by carrier substrate growth surface area. For example, the substrate may comprise at least 30, 40, 50, or 60 single crystal CVD diamond substrates. These single crystal CVD diamond substrates may be spaced apart on the growth surface of the carrier substrate whereby the synthetic diamond material is grown as a plurality of separate single crystals. Alternatively, the single crystal CVD diamond substrates may be located in contact with each other, or in close proximity, to form a tiled array whereby the synthetic diamond material is grown as a single continuous layer of synthetic diamond material over the tiled array of single crystal CVD diamond substrates. In this case, as previously described, the high power density conditions are intended to aid overgrowth at interface regions between the single crystal CVD diamond substrates without the requirement to add significant quantities of nitrogen which reduces the optical quality of the large area, tiled single crystal diamond product.

Using the methodology as described herein the synthetic diamond material may be grown at a volume growth rate over the substrate of no less than $1 \times 10^9$ micrometers$^3$/hour, $5 \times 10^9$ micrometers$^3$/hr, $1 \times 10^{10}$ micrometers$^3$/hr, $3 \times 10^{10}$ micrometers$^3$/hr, $4 \times 10^{10}$ micrometers$^3$/hr, $6 \times 10^{10}$ micrometers$^3$/hr, or $8 \times 10^{10}$ micrometers$^3$/hr. In the case where a plurality of separate spaced apart single crystal diamond substrates are provide the volume growth rate is calculated as the volume of single crystal diamond material grown on the plurality of single crystal diamond substrates per unit time. In the case where a tiled array of single crystal diamond substrates is provided such that a single layer of single crystal diamond material grows over the plurality of single crystal diamond substrates then the volume growth rate is calculated as the volume of the single layer of single crystal diamond material grown per unit time.

Furthermore, the methodology as described herein is capable of fabricating large volumes of synthetic diamond material at a high volume growth rate which, if cut into a 0.5 carat round brilliant gemstone, exhibits a colour grade of D, E, or F.

Further details of the reactor hardware, synthesis conditions, and material products are given below.

Reactor Hardware

CVD reactor hardware has been configured so as to capable of maintaining high and uniform power densities over large area substrates for prolonged periods of time. The CVD reactor hardware is also capable of generating the following combination of synthesis conditions:
  high process gas flow rates oriented towards a growth surface with a low Reynolds number gas injection parameter;
  high operating pressures;
  high microwave operating powers;
  efficient and precise thermal management;
  controlled and uniform electromagnetic fields resulting in a uniform large area plasma and a uniform power density across the substrate growth surface; and
  plasma chamber design configured to provide minimal contamination from the microwave inlet and side walls of the plasma chamber.

In relation to the above, a suitable CVD reactor components are described in WO2012/084661, WO2012/084657, WO2012/084658, WO2012/084659, WO2012/084655, WO2012/084661, and WO2012/084656. An example of a CVD reactor configuration is illustrated schematically in FIG. 1 of the present specification.

The microwave plasma reactor comprises the following basic components: a plasma chamber 102; a substrate holder 104 disposed in the plasma chamber for holding a substrate 105; a microwave generator 106 for forming a plasma 108 within the plasma chamber 102; a microwave coupling configuration 110 for feeding microwaves from the microwave generator 106 into the plasma chamber 102 via a coaxial waveguide and through an annular dielectric window 119; a gas flow system 112, 122 for feeding process gases into the plasma chamber 102 and removing them therefrom; and a substrate coolant system 114 for controlling the temperature of a substrate 105.

The plasma chamber 102 may have a number of different configurations suitable for supporting a standing microwave. However, it is found that a particularly preferred configuration utilizes a simple modal synthesis chamber, for instance the $TM_{011}$ mode is advantageous as it has been found to be the most compact (small) mode which can be practicably used in a diamond CVD plasma reactor. Its compactness means that the impact of gas flow aspects on the near gas phase chemistry are maximized. The use of a small plasma chamber having a compact microwave cavity is made possible by the flow characteristics of the gas inlet which ensures that process gas flows through a central portion of the plasma chamber without undue circulation of gases within the plasma chamber contaminating walls of the chamber which will be relatively close to the gas flow in a compact cavity arrangement.

The gas flow system 112 comprises source gas containers 117 and a gas inlet coupled to the source gas containers and positioned in a top portion of the plasma chamber 102 axially disposed above the substrate holder 104 and substrate 105 for directing process gases towards the substrate 105 in use. In the illustrated embodiment the process gas is fed from the source gas containers 117 to the gas inlet through a central conductor of the microwave coupling configuration 110. However, other configurations are also possible for feeding the process gases to the gas inlet 124.

The microwave window 119 for feeding microwaves from the microwave generator into the plasma chamber is preferably disposed at an opposite end of the plasma chamber to the substrate holder. Furthermore, the gas inlet is preferably disposed closer to the substrate holder than the microwave window. Such an arrangement can minimize the possibility of the microwave window being contaminated with process gases while also ensuring that the process gas is injected at a location relatively close to the substrate.

The gas inlet nozzle array 124 comprises a plurality of gas inlet nozzles disposed opposite the substrate holder 104 for injecting process gases towards the substrate holder 104 at high flow rate and low Reynolds number. The gas inlet nozzle array 124 comprises a plurality of gas inlet nozzles disposed in a substantially parallel orientation relative to the central axis of the plasma chamber 102. The gas inlet array 124 also comprises a housing 128 defining a cavity 130 for receiving process gases from one or more gas inlet pipes. The housing 128 also defines the plurality of inlet nozzles for injecting process gases from the cavity 130 into the plasma chamber 102 and towards the substrate holder 104. For example, the housing may comprise metallic walls in which the inlet nozzles are integrally formed.

One or more gas outlets 122 are provided in a base of the plasma chamber 102. The gas outlets 122 are preferably located in a ring around the substrate holder 104 and most preferably form a uniformly spaced array around the substrate holder 104 to enhance continuous gas flow from the gas inlet 120 towards the substrate 105, around the substrate 105, and out of the gas outlets 122 while minimizing turbulence and gas recirculation back up the plasma chamber 102. In this regard, it should be noted that while the reactor configuration functions to reduce uncontrolled gas re-circulation within the plasma chamber, this does not preclude the possibility of using a controlled gas re-circulation system outside the plasma chamber for re-using process gas which is extracted from the plasma chamber through the gas outlets.

Synthesis Conditions

WO2012/084656 describes that a CVD reactor as illustrated in FIG. 1 can achieve CVD diamond synthesis at high gas flow rates, high pressures, and high powers. WO2012/084656 further describes that this is advantageous for synthesising doped CVD diamond materials, such as boron doped CVD diamond materials, with high dopant levels and/or more uniform dopant concentrations over larger areas. The present applicant has found that it is possible to maintain a high power density over large areas for extended periods of time to achieve synthesis of large volumes of high quality CVD diamond material at high growth rates and with less sensitivity to impurities. In contrast to WO2012/084656, it has also been found that high gas flow rates, high pressures, and high power densities are advantageous for synthesising un-doped, very high purity single crystal CVD synthetic diamond material at increased growth rates. Previous approaches to try to increase the growth rate of very high purity single crystal CVD diamond material involved: increasing $CH_4$ concentration in the synthesis atmosphere; increasing process gas flow; and increasing substrate growth temperature. The first two approaches led to NV incorporation while the third approach lead to surface twinning. Only maintaining a high power density as described herein was successful in growing very high purity single crystal CVD diamond material with increased growth rates.

When compared to prior art growth processes for fabricating very high purity single crystal CVD diamond material such as that described in WO01/096633 and WO01/096634, the present growth process differs in that it utilizes a higher power density across the carrier substrate, a higher pressure, a higher gas flow rate, and a higher concentration of carbon containing process gas. In this regard, it should be appreciated that single crystal CVD diamond growth comprises a complex, multi-dimensional parameter space and one embodiment involves the identification of a combination of interrelated operating parameters within this complex, multi-dimensional parameter space in order to achieve fabrication of a very high purity single crystal CVD diamond material at increased growth rates. The fabrication method comprises:

introducing process gases into a plasma chamber, the process gases including hydrogen gas and a carbon source gas; and
  introducing microwaves into the plasma chamber to activate the process gases and form a plasma proximate to a growth surface of a plurality of single crystal diamond substrates disposed on a support substrate, wherein the single crystal CVD synthetic diamond material is grown on the growth surface of each of the plurality of single crystal diamond substrates,
  wherein during growth of the single crystal CVD synthetic diamond material the following growth conditions are utilized:
  a temperature of the single crystal diamond substrates lies in a range 750° C. to 900° C.;
  a pressure within the plasma chamber lies in a range 175 to 225 Torr;
  a hydrogen gas flow rate lies in a range 7 to 12 standard litres per minute;
  a concentration of carbon source gas within the process gas lies in a range 3.0% to 7.0%;
  a concentration of nitrogen within the process gas is no more than 1 part-per-million; and
  a microwave power density across the support substrate is in a range 3 to 6 $W/mm^2$.

Preferably, the process utilizes a microwave power of at least 15 kW, 17 kW, 19 kW, or 22 kW. For example, the microwave power may lie in a range 15 kW to 35 kW, 17 kW to 30 kW, 19 kW to 27 kW, or 22 kW to 25 kW. Furthermore, the support substrate may have a diameter of at least 60 mm, 70 mm, 80 mm, 90 mm, or 100 mm and/or no more than 140 mm, 130 mm, 120 mm, or 110 mm. For example, the support substrate may have a diameter in a range 60 mm to 140 mm, 60 mm to 120 mm, 70 mm to 110 mm, or 80 mm to 100 mm. The support substrate may be loaded with a plurality of single crystal diamond substrates numbering at least 30, 40, 50 or 60.

The aforementioned process is capable of fabricating very high purity single crystal CVD diamond material in a more economical manner than was previously the case for such material. Furthermore, the growth rate of the material is such that it may also replace lower purity single crystal CVD diamond material to the extent that it is easier to control the reproducibility of the process when compared to a controlled nitrogen addition growth process.

Without being bound by theory, the increase in growth rate is attributed to an increase in flux of growth species resulting from the higher power density, higher gas temperature, higher carbon concentration, higher gas flow rates, and higher operating pressures. At the same time, such operating conditions achieve higher growth rates while also maintain very high quality single crystal CVD diamond growth with substantially no sp2 carbon and substantially no impurities. For example, an increase in growth rate has been achieved without introducing NV related luminescence. Increasing power density reduces nitrogen uptake. As such, even when some nitrogen is present as an impurity it is still possible to achieve very high purity single crystal CVD diamond product. It is believed that this is due to an increase in the production of atomic hydrogen which can prevent the uptake of impurities at the growth surface of the diamond material. Further still, the new material lacks dislocation luminescence which is believed to be causally linked to the increase in growth rate in this window of parameter space.

Certain embodiments are thus based on a single crystal CVD diamond growth process which is substantially free of nitrogen but which can generate growth rates over twice those achieved in prior art growth processes which are substantially free of nitrogen such as described in WO01/096633 and WO01/096634. Such a process can achieve growth rates comparable to those achieved by a low and controlled addition of nitrogen such as described in WO2004/046427. As such, embodiments can generate a single crystal CVD diamond material which is very high purity at increased growth rates while avoiding the addition of nitrogen to enhance growth rates.

The single crystal CVD diamond material has many properties comparable with those of WO01/096633 and thus has properties suitable for certain high-end optical applications and certain other applications such as electronic, radiation detector, and quantum sensing and processing applications.

In addition, even for applications which are not detrimentally affected by the presence of a low and controlled concentration of nitrogen in the single crystal CVD synthetic diamond material, the new growth process is capable of fabricating a single crystal CVD diamond material which has more consistent and reproducible optical properties while maintaining a comparable growth rate to that achieved by a low and controlled nitrogen addition.

Further still, the single crystal CVD diamond material according to the present invention is distinguished over prior art high purity single crystal CVD synthetic diamond material such as that described in WO01/096633 and WO01/096634 in that is exhibits substantially no fluorescence from dislocation defects in addition to substantially no fluorescence from nitrogen-vacancy defects.

While a high purity single crystal growth process is described above as an example of the use of the methodology described herein, the presently described methodology is not limited to such a high purity growth process. For example, as previously described, it is also advantageous to apply high power densities over large substrate areas and for extended time periods to synthesise lower purity single crystal CVD diamond material as high growth rates, polycrystalline CVD diamond wafers, and large area, tiled single crystal CVD diamond products.

An example of the method steps for fabricating a large area, tiled single crystal CVD diamond product is given below.

In step (i) a tiled array of single crystal diamond substrates are mounted on a carrier substrate. The single crystal diamond substrates are located in contact or close proximity.

In step (ii), a layer of single crystal CVD diamond material is grown over the tiled array of single crystal diamond substrates. In accordance with the present methodology synthesis is performed by maintaining a high power density across the tiled array of single crystal diamond substrates to aid intergrowth of diamond material over adjacent substrates while avoiding undue nitrogen incorporation into the layer of single crystal CVD diamond material.

Finally, in step (iii) the layer of single crystal CVD diamond material is optionally separated from the tiled array of single crystal CVD diamond substrates to form a free-standing single crystal CVD diamond wafer. One known method for achieving release of the layer of single crystal CVD diamond material is via implantation and chemical etching to achieve separation of the layer of single crystal CVD diamond material from the tiled array of single crystal CVD diamond substrates. The material product will generally comprise a plurality of inter-crossing dislocation lines corresponding to interfaces between individual single crystal diamond substrates on which the layer of single crystal CVD diamond material was grown.

Material Products

High Purity Single Crystal CVD Diamond Product

Figure 2:
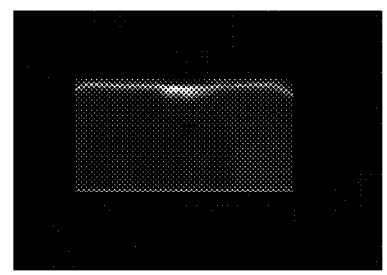
FIG. 2 shows a DiamondView™ image of a single crystal CVD diamond material.
Figure 3:
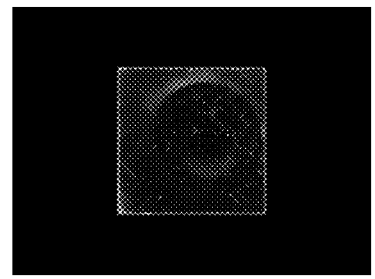
FIG. 3 shows a DiamondView™ image of another single crystal CVD diamond material.

An image taken using DiamondView™ of a single crystal CVD diamond material fabricated as described herein is shown in FIG. 2 while a counter example grown using the methodology as described in WO01/096633 and WO01/096634 is shown in FIG. 3. The single crystal CVD synthetic diamond material in FIG. 2 comprises substantially no NV luminescence and substantially no dislocation luminescence while the counter example shown in FIG. 3 shows significant blue dislocation luminescence.

The orange luminescence from nitrogen-vacancy defects and the blue luminescence from dislocation defects can be measured as follows:

(i) a DiamondView™ image of the single crystal CVD synthetic diamond material is taken using an integration time of 10 seconds with aperture and field stop settings set to 100%, gain set to 0.00 dB, and gamma enhancement set to off; and (ii) the DiamondView™ image is analysed to determine the intensity of orange and blue luminescent components using digital image analysis software, wherein the image analysis comprises the following steps:

(a) splitting the DiamondView™ image into red, green, and blue component images, the red image comprising the orange luminescence from nitrogen-vacancy defects and the blue image comprising the blue luminescence from dislocation defects;

(b) converting the red and blue images to greyscale images having an intensity range of 0 to 255 with white corresponding to an intensity value of 255 and black corresponding to an intensity value of 0, wherein the red image has a mean intensity value of less than 25, 20, 15, 12, 10, 8, or 5 and wherein the blue image has a mean intensity value of less than 25, 20, 15, 10, 8, 5, or 2.

The red image and/or the blue image may also have a mode intensity value of less than 10, 5, or 2. Furthermore, the DiamondView™ image is analysed over an area of at least 0.3 mm$^2$, 0.6 mm$^2$, 1.0 mm$^2$, 2.0 mm$^2$, 3.0 mm$^2$, 5.0 mm$^2$, 7.0 mm$^2$, 10.0 mm$^2$, 25.0 mm$^2$, 50.0 mm$^2$, or 100.0 mm$^2$.

In accordance with the aforementioned methodology, DiamondView™ images were analysed using the freeware ImageJ program (http://rsbweb.nih.gov/ij/). It is possible to deduce a histogram of colour values for a fluorescence image of a diamond sample, in order to quantify its fluorescence characteristics. The following procedure was employed to analyse the DiamondView™ images of samples produced using the present synthesis methodology and the prior art process.

For each sample, one of the {100} surfaces was analysed. A DiamondView™ image was taken using an integration time of 10 s, the aperture and field stop settings were set to 100%, the gain value was setting to 0.00 dB (i.e. minimising noise) and the gamma enhancement setting was set to 'off' (i.e. a linear gamma curve). The image was loaded into ImageJ. The first stage of the analysis involved splitting the red, green and blue components of the image by selecting the 'Split Channels' command from the 'Color' submenu under the 'Image menu'.

The strength of the red/orange luminescence arising from NV centers was quantified by analysing the red image component and rejecting the green and blue components. The strength of the blue luminescence arising from dislocations was quantified by analysing the blue image component and rejecting the red and green components. From each of the red and blue components, a selected rectangle was taken, avoiding the sample surface, the substrate, any twinned or included regions that could influence the measurement, and any artefacts due to the sample holder. Note that this rectangle should be larger than 0.3 mm$^2$, preferably larger than 0.6 mm$^2$, or more preferably larger than 1.0 mm$^2$ or more as previously described. Clicking 'Analyse' and then 'Histogram' revealed the histogram and the statistical parameters:

| | RED CHANNEL | | | | | |
|---|---|---|---|---|---|---|
| | Area | Mean | Standard Deviation | Min | Max | Mode |
| Example | 1 × 1 mm | 5.953 | 1.372 | 3 | 105 | 6 |
| Counter Example | 1 × 1 mm | 7.641 | 2.832 | 0 | 63 | 8 |

| | BLUE CHANNEL | | | | | |
|---|---|---|---|---|---|---|
| | Area | Mean | Standard Deviation | Min | Max | Mode |
| Example | 1 × 1 mm | 2.845 | 2.201 | 0 | 93 | 2 |
| Counter Example | 1 × 1 mm | 30.571 | 43.031 | 0 | 255 | 11 |

One can deduce the following from the above data:

(i) the red component values for the two samples are very similar, indicating broadly comparable NV uptake in material grown using the new process as compared to the prior art process;
(ii) in both the example and counter example, the red component of fluorescence is very low, indicating that in both cases the red/orange fluorescence is negligible in DiamondView™ images;
(iii) both the mean and the mode of the blue component values are significantly lower for material grown using the presently described process compared to the prior art process, as expected from comparison of FIGS. 2 and 3;
(iv) there is a far smaller standard deviation of the blue component for material grown using the presently described process than for the prior art process, consistent with the blue fluorescence in the latter arising from dislocations that have a high degree of linearity in the DiamondView™ images.

From this analysis, it can be deduced that the DiamondView™ images of material grown using the presently described growth process are essentially inert. The material grown using the new process exhibits the characteristics:
(i) negligible orange fluorescence arising from NV defects, thereby implying a similar uptake of point defects as compared to the prior art process; and
(ii) negligible dislocation fluorescence, unlike that of the prior art process.

For material grown using the new process, charge transport measurements have been performed using the following procedure. First, the samples were pre-cleaned using acid and oxygen plasma. Then, Ti/Al mesh contacts were patterned by sputtering and photolithography. Then, the samples were illuminated with 213 nm, 3 ns laser pulses and different bias voltages were applied to the contacts. The total collected charge was measured by integrating the current measured using a broadband amplifier. Fitting to Hecht relation then gives the mobility-lifetime product and charge collection distance. Any trapping was eliminated by illuminating the samples with three laser pulses at zero bias between every measurement.

Two samples grown using the new process and were measured using this procedure. The results are shown below:

|  | Thickness (μm) | e-mobility cm²/Vs | h-mobility cm²/Vs | $\mu_e \tau_e \times 10^{-6}$ cm²/V | $\mu_h \tau_h \times 10^{-6}$ cm²/V |
|---|---|---|---|---|---|
| Sample 1 | 640 | 1350 | 2660 | 190 | 230 |
| Sample 2 | 550 | 2330 | 2160 | 250 | 180 |

Figure 4:
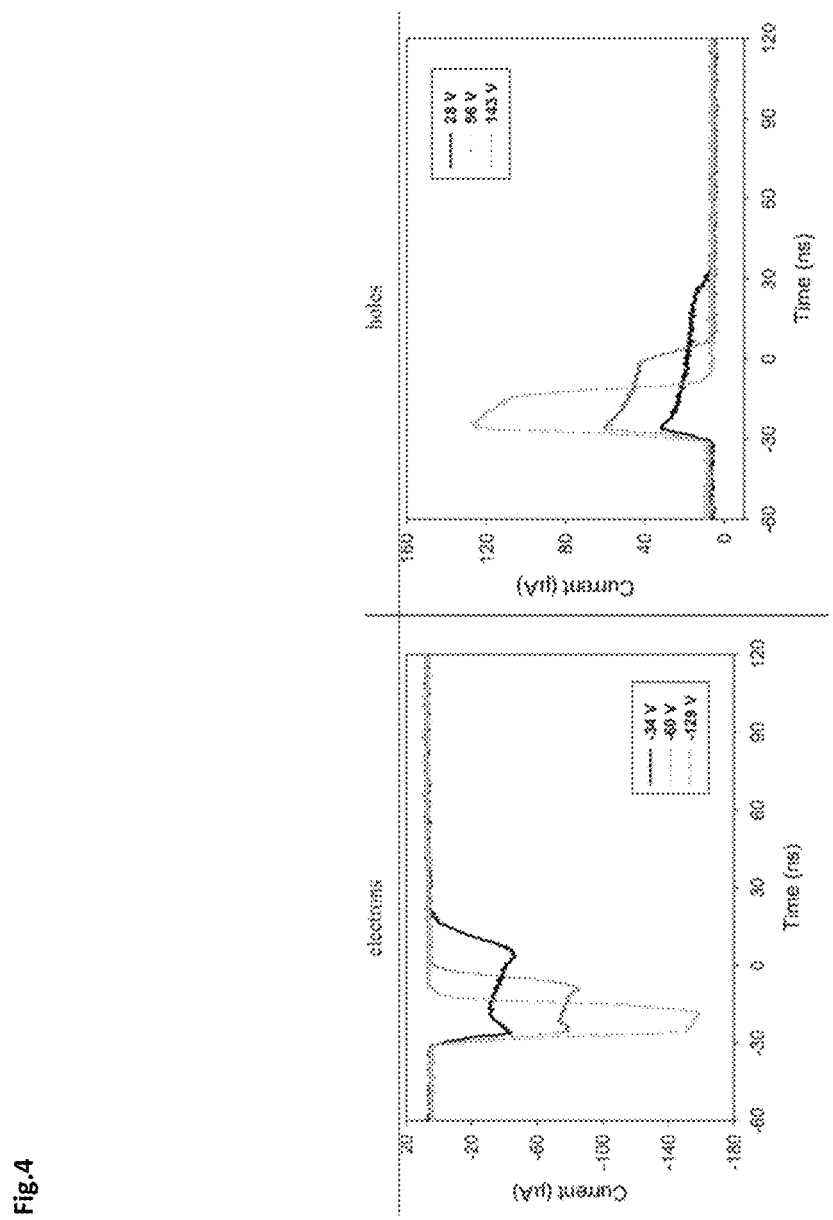
FIG. 4 shows current versus time plots for a single crystal CVD diamond material.

The current versus time plots for one of the samples (Sample 2) are shown in FIG. 4, and display clean characteristics with little evidence of dispersion.

The material may have comparable electronic properties to the material described in WO01/096633 and WO01/096634. For example, the single crystal CVD synthetic diamond material may comprise one or more of the following electronic characteristics:
a $\mu\tau$ product measured at 300K greater than $1.5 \times 10^{-6}$ cm²V$^{-1}$, $4.0 \times 10^{-6}$ cm²V$^{-1}$, or $6.0 \times 10^{-6}$ cm²V$^{-1}$, $10 \times 10^{-6}$ cm²V$^{-1}$, $50 \times 10^{-6}$ cm²V$^{-1}$, $100 \times 10^{-6}$ cm²V$^{-1}$, $150 \times 10^{-6}$ cm²V$^{-1}$, $180 \times 10^{-6}$ cm²V$^{-1}$, $200 \times 10^{-6}$ cm²V$^{-1}$, $220 \times 10^{-6}$ cm²V$^{-1}$, or $240 \times 10^{-6}$ cm²V$^{-1}$ where $\mu$ is charge carrier mobility and $\tau$ is charge carrier lifetime;

an electron mobility ($\mu_e$) measured at 300K greater than 1500 cm²V$^{-1}$s$^{-1}$, 2000 cm²V$^{-1}$s$^{-1}$, 2400 cm²V$^{-1}$s$^{-1}$, 3000 cm²V$^{-1}$s$^{-1}$, or 4000 cm²V$^{-1}$s$^{-1}$;
a hole mobility ($\mu_h$) measured at 300K greater than 1500 cm²V$^{-1}$s$^{-1}$, 1800 cm²V$^{-1}$s$^{-1}$, 2100 cm²V$^{-1}$s$^{-1}$, 2500 cm²V$^{-1}$s$^{-1}$, or 3000 cm²V$^{-1}$s$^{-1}$;
a charge collection distance greater than 150 μm, 400 μm, or 600 μm measured at an applied field of 1 V/μm and 300 K; and
a resistivity (R) greater than $1 \times 10^{12}$ Ωcm, $2 \times 10^{13}$ Ωcm, or $5 \times 10^{14}$ Ωcm, at an applied field of 50 V/μm measured at 300 K.

Furthermore, the material may have comparable optical properties to the material described in WO01/096633 and WO01/096634. For example, the single crystal CVD synthetic diamond material may comprise one or more of the following characteristics:
a photoluminescence (PL) line related to the cathodoluminescence (CL) line at 575 nm, measured at 77 K under 514 nm Ar ion laser excitation (nominally 300 mW incident beam), which has a peak height less than 1/1000 of the diamond Raman peak at 1332 cm$^{-1}$; and
a free exciton (FE) emission, where the strength of the free exciton emission excited by 193 nm ArF excimer laser at room temperature is such that the quantum yield for free exciton emission is at least $10^{-5}$.

Further still, the material may have some optical properties comparable to the material described in WO2004/046427 and WO2007/066215. For example, the single crystal CVD synthetic diamond material may comprise one or more of the following characteristics:
an extended defect density as characterised by X-ray topography of less than 400/cm² over an area of greater than 0.014 cm²;
an optical isotropy of less than $1 \times 10^{-5}$ over a volume greater than 0.1 mm³;
an X-ray rocking curve for the (004) reflection has a full width at half maximum (FWHM) of less than 10 arc seconds;
a birefringence of no more than $1 \times 10^{-5}$ determined using a light beam with a cross-sectional area greater than 0.01 mm².

In relation to the above, in order to achieve these characteristics it is advantageous to utilize single crystal diamond substrates having a low concentration of surface defects and carefully treat such substrates with an in situ plasma etch prior to performing single crystal CVD diamond growth thereon as described, for example, in WO01/096633 and WO01/096634.

Furthermore, according to certain embodiments the material shares some of the quantum properties of the materials described in WO 2010010344 and WO 2010010352. For example, the single crystal CVD synthetic diamond material may comprise one or more of the following characteristics:
one or more NV$^-$ defects having a decoherence time T$_2$ at room temperature of no less than 100 μs, 300 μs, 500 μs, 1 ms, 2 ms, 5 ms, 10 ms, 50 ms, or 100 ms; and
one or more NV$^-$ defects having a full width half maximum intrinsic inhomogeneous zero phonon line width of no more than 500 MHz, 300 MHz, 200 MHz, 150 MHz, 100 MHz, 80 MHz, 50 MHz, or 40 MHz wherein the full width half maximum intrinsic inhomogeneous zero phonon line width is averaged over at least 10, 20, 30, 50, 75, 100, 500, or 1000 seconds and/or over at least 10, 20, 30, 50, 75, 100, 500, or 1000 spectral scans.

In order to achieve very low full width half maximum intrinsic inhomogeneous zero phonon line widths the material may be subjected to annealing such as a multi-stage annealing treatment after synthesis. Furthermore, in order to achieve very high decoherence times the material may be fabricated using isotopically purified carbon source gas.

In terms of impurities, the single crystal CVD synthetic diamond material may comprise one or more of:
- a total nitrogen concentration, as measures by secondary ion mass spectrometry, of no more than 100 ppb, 60 ppb 40 ppb, 20 ppb, or 10 ppb;
- a single substitutional nitrogen concentration, as measured by electron paramagnetic resonance, of no more than 100 ppb, 60 ppb 40 ppb, 20 ppb, or 10 ppb;
- an as-grown nitrogen-vacancy defect concentration of no more than 20 ppb, 10 ppb, 5 ppb, or 1 ppb;
- a concentration of boron (and/or a concentration of uncompensated substitutional boron) of no more than 100 ppb, 50 ppb, 20 ppb, 10 ppb, 5 ppb, 2 ppb, 1 ppb, 0.5 ppb, 0.2 ppb, or 0.1 ppb;
- a concentration of silicon of no more than 100 ppb, 50 ppb, 20 ppb, 10 ppb, 5 ppb, 2 ppb, 1 ppb, 0.5 ppb, 0.2 ppb, 0.1 ppb, or 0.05 ppb;
- a concentration of the silicon-vacancy (referred to as "SiV"), characterised by the intensity of the 737 nm photoluminescence (PL) line normalised against the intensity of the diamond Raman line at a shift of about 1332.5 $cm^{-1}$, both measured at a temperature of about 77 K, of no more than 0.5 ppb, 0.2 ppb, 0.1 ppb, 0.05 ppb, 0.02 ppb, 0.01 ppb, or 0.005 ppb;
- a concentration of intrinsic paramagnetic defects (i.e. defects which have a non-zero magnetic spin) of no more than 1 ppm, 0.5 ppm, 0.2 ppm, 0.1 ppm, 0.05 ppm, 0.02 ppm, 0.01 ppm, 0.005 ppm, or 0.001 ppm;
- a total concentration of $^{13}C$ of 0.9% or less;
- a concentration of any single non-hydrogen impurity of no more than 5 ppm, 1 ppm, or 0.5 ppm;
- a total impurity content excluding hydrogen and its isotopes of no more than 10 ppm, 5 ppm, or 2 ppm; and
- a concentration of hydrogen impurities (specifically hydrogen and its isotopes) of no more than $10^{18}$ $cm^{-3}$, $10^{17}$ $cm^{-3}$, $10^{16}$ $cm^{-3}$, or $10^{15}$ $cm^{-3}$.

Large Area, Tiled Single Crystal CVD Diamond Product

A large area single crystal CVD diamond layer can be formed as described herein by growing over a tiled array of substrates and using high power densities over large areas to drive growth of the tiled substrates. Although the large area single crystal CVD diamond layer is formed of single crystal CVD diamond material, the material may exhibit a plurality of inter-crossing dislocation lines corresponding to interfaces between individual single crystal diamond substrates on which the layer of single crystal CVD diamond material was grown. Such large area tiled single crystal CVD diamond layers or wafers have already been described previously in the art. The distinction here is that the large area, tiled single crystal CVD diamond wafer comprises a low nitrogen content with overgrowth over a tiled array of substrates being driven by use of a high power density rather than significant quantities of nitrogen in the process gases. As such, a single crystal CVD diamond layer is provided comprising:
- a total nitrogen concentration as measures by secondary ion mass spectrometry of no more than 2 ppm; and
- an area of at least 324 $mm^2$.

The total nitrogen concentration may be no more than 1.5 ppm, 1.0 ppm, 0.8 ppm, 0.5 ppm 0.1 ppm, 0.05 ppm, or 0.01 ppm depending on the requirements of the end application.

Furthermore, the area of the single crystal CVD diamond wafer may be at least 361 $mm^2$, 400 $mm^2$, 484 $mm^2$, 625 $mm^2$, 900 $mm^2$, 1600 $mm^2$, or 2500 $mm^2$. Further still, the single crystal CVD diamond wafer has a thickness of at least 30 micrometers, 60 micrometers, 100 micrometers, 150 micrometers, 200 micrometers, 250 micrometers, 300 micrometers, or 500 micrometers. The single crystal CVD diamond wafer may also exhibit one or both of the following characteristics:
(i) an optical absorption coefficient at a wavelength of 1.064 μm of less than 0.09 $cm^{-1}$, 0.05 $cm^{-1}$, 0.02 $cm^{-1}$, or 0.01 $cm^{-1}$.
(ii) an optical absorption coefficient at a wavelength of 10.6 μm of less than 0.04 $cm^{-1}$, 0.03 $cm^{-1}$, 0.02 $cm^{-1}$, or 0.01 $cm^{-1}$.

Furthermore, if growth conditions are selected to fabricate very high purity single crystal diamond material as described previously then the single crystal CVD diamond layer or free-standing wafer may comprise a plurality or regions formed of single crystal CVD diamond material having one or more of the characteristics as previous described in relation to the high purity single crystal CVD diamond product.

Devices and Applications

The aforementioned material characteristics are advantageous for a range of different devices and applications.

The electronic characteristics are advantageous for use in electronic and radiation detector devices. See, for example, U.S. Pat. Nos. 6,204,522, 6,222,141, and 8,053,783 which relate to high power switching device and WO99/64892, WO01/69285, and WO2004/023160 which relate to radiation detector devices utilizing single crystal CVD diamond material.

The thermal characteristics are advantageous for use in thermal heat spreading applications such as in electronic and optical devices.

The optical characteristics are advantageous for use as optical components such as prisms for ATR spectroscopy, high power laser windows and lenses, and Raman laser crystals. See, for example, U.S. Pat. Nos. 6,507,396, 8,309, 205, WO2012/013687, WO2102/034926, and WO2011/086164.

The quantum characteristics are advantageous for use in quantum sensing and information processing applications. See, for example, WO2009/073736 and WO2009/073740 which describe diamond based quantum magnetometers, WO2012/034924 which describes a diamond based microfluidic NMR device, and GB2495632 which describes a diamond based multi-photon quantum interference device suitable for quantum information processing applications.

While this invention has been particularly shown and described with reference to embodiments, it will be understood to those skilled in the art that various changes in form and detail may be made without departing from the scope of the invention as defined by the appending claims.

The invention claimed is:
1. A method of fabricating a single crystal CVD diamond layer using a microwave plasma activated chemical vapour deposition technique, the single crystal CVD diamond layer having a total nitrogen concentration as measured by secondary ion mass spectrometry of no more than 2 ppm and an area of at least 324 $mm^2$, the method comprising:
   introducing a substrate into a plasma chamber;
   introducing process gases into the plasma chamber, the process gases including hydrogen gas and a carbon source gas; and introducing microwaves into the plasma chamber to activate the process gases and form a plasma proximate to a growth surface of the substrate wherein synthetic diamond material is grown over the growth surface of the substrate, wherein during growth of the synthetic diamond material a microwave power density is maintained at a power density of at least 3 W/mm$^2$ over a growth surface area of at least 2500 mm$^2$ for a time period of at least 24 hours said microwave power density being calculated by dividing input microwave power by substrate growth surface area; and the single crystal CVD diamond layer exhibits substantially no fluorescence from dislocation defects in addition to substantially no fluorescence from nitrogen-vacancy defects.

2. A method according to claim 1, wherein the microwave power density is at least 3.2 W/mm$^2$, 3.4 W/mm$^2$, or 3.6 W/mm$^2$.

3. A method according to claim 1, wherein the microwave power density is no more than 10 W/mm$^2$, 8 W/mm$^2$, 6 W/mm$^2$, 5 W/mm$^2$, or 4 W/mm$^2$.

4. A method according to claim 1, wherein the microwave power density is maintained at a target value with a variation over time of no more than ±5%, ±3%, ±2%, or ±1% as measured by fluctuations in total power input to the plasma chamber averaged over 5 second measurement periods for a time period forming at least 30%, 50%, 70%, 90%, or 95% of a total growth time period.

5. A method according to claim 1, wherein the growth surface area is at least 2827 mm$^2$, 3848 mm$^2$, 5027 mm$^2$, 6362 mm$^2$, or 7054 mm$^2$.

6. A method according to claim 1, wherein the growth surface area is no more than 15394 mm$^2$, 13273 mm$^2$, 11310 mm$^2$, or 9503 mm$^2$.

7. A method according to claim 1, wherein the time period is at least 48 hours, 72 hours, 96 hours, 120 hours, 168 hours, 216 hours, 288 hours, 360 hours, 432 hours, or 504 hours.

* * * * *